3,140,606
DIGITAL RATE OF FLOW TRANSDUCER
Martin R. Kramer, Jackson Heights, and Theodore J. Silver, Merrick, N.Y., assignors to United Aircraft Corporation, East Hartford, Conn., a corporation of Delaware
Filed Sept. 29, 1960, Ser. No. 59,354
9 Claims. (Cl. 73—205)

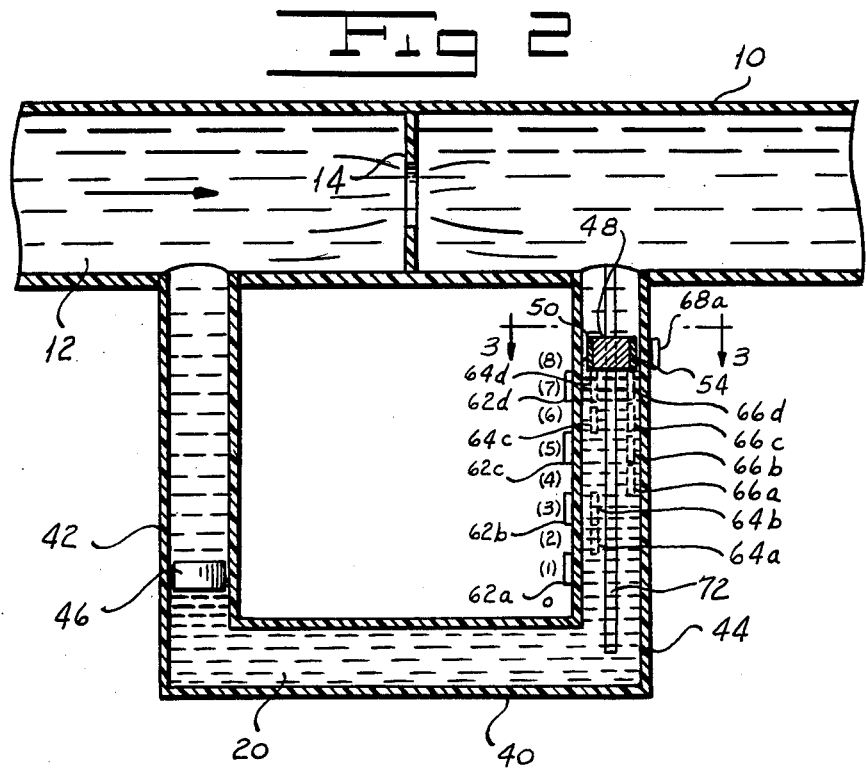
Fig 2
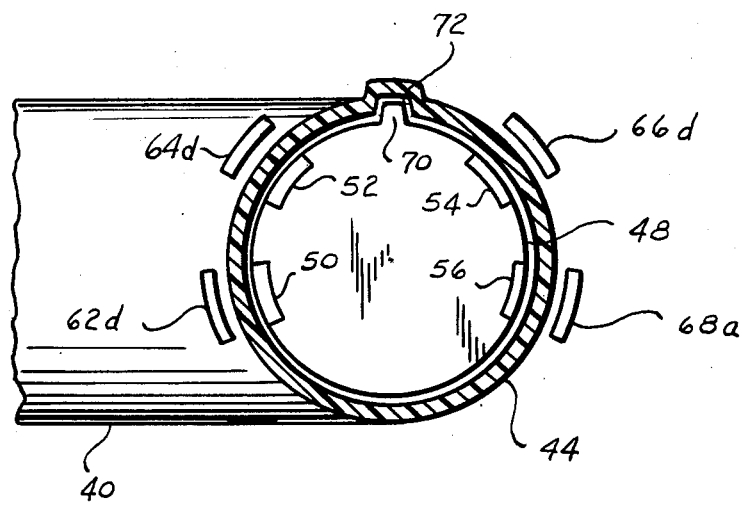
Fig 3
INVENTORS
MARTIN R. KRAMER
THEODORE J. SILVER
BY
ATTORNEY

Our invention relates to a magnetic, digital rate of flow transducer and more particularly to an improved transducer that utilizes magnetic field sensors for measuring the rate of and for producing a digital output corresponding to the rate of fluid flow.

Apparatus for measuring the rate of fluid flow are well known in the prior art. A number of such devices utilize elements that project externally from inside the flow tube. This is undesirable where toxic or inflammable fluids are being measured, since there is danger of fluid leakage. Other such devices produce only a mechanical measurement proportional to rate of fluid flow, which must be converted where an electrical output is necessary. This requires added components and entails added expense. Another group of these devices, while able to directly produce electrical measurements proportional to fluid velocity, are disadvantageous when a digital output is required, since some form of converter must be added.

The devices in the prior art usually introduce a quadratic nonlinearity into the measurement of fluid velocity.

We have invented apparatus for measuring the rate of fluid flow which is simple in construction and which overcomes the disadvantages of the prior art. Our apparatus has no linkages protruding externally from the fluid being measured thus making it safe for use where the fluid is toxic or inflammable. Our apparatus produces a direct electrical output that may be digital in character. Our apparatus may be so constructed as to give a coded multitrack digital output where necessary. Our apparatus may also be so constructed as to give a linear output and thus avoid the quadratic nonlinearity usually associated with measurement of fluid velocity by prior devices.

One object of our invention is to provide rate of fluid flow measuring apparatus that is simple in construction.

Another object of our invention is to provide rate of fluid flow measuring apparatus that has no external linkages protruding from the interior of the flow tube.

Still another object of our invention is to provide rate of fluid flow measuring apparatus that will give a digital output.

A further object of our invention is to provide rate of fluid flow measuring apparatus that may give a multitrack digital output.

A still further object of our invention is to provide rate of fluid flow measuring apparatus that will give an output that is linearly proportional to fluid velocity.

Other and further objects of our invention will appear from the following description.

In general our invention contemplates the provision of a conduit carrying moving fluid and an obstruction disposed within the tube to create a pressure differential. In one form of our invention the obstruction is fixedly mounted within the conduit and a manometer tube containing gauge fluid such as mercury is connected to the flow tube on opposite sides of the obstruction. Two slugs of equal weight are floated respectively in each leg of the manometer tube, one slug being either a permanent magnet or composed of ferromagnetic material and the other slug being of any desired material. One or more columns of magnetic field sensors are mounted adjacent the leg of the manometer tube containing the ferromagnetic slug or permanent magnet. Flow in the tube will create a pressure differential which causes a change in the level of gauge fluid in the manometer legs. As a result of this level change, the position of the slug containing the permanent magnet will also change. This new position gives a measurement of the fluid velocity and the output from the magnetic sensor which is adjacent to the magnetic slug will give an indication of this fluid velocity. If a ferromagnetic slug is substituted for the slug containing the permanent magnet, a large permanent magnet must be mounted on the manometer leg in the proximity to and opposite the columns of magnetic sensors. When the slug is adjacent to a sensor it will link magnetic lines of flux from the magnetic field of the magnet to a sensor. One of the sensors will thus detect the position of the ferromagnetic slug and its output will be an indication of the fluid velocity.

In another form of our invention the obstruction is movably positioned within the tube by means of springs affixed to the tube. One or more permanent magnets are mounted on the outer surface of the obstruction. One or more columns of magnetic field sensors are mounted adjacent the outside of the flow tube. The pressure differential created by the obstruction will act to displace it, the motion being limited by the restraining force of the springs. Since the position of the obstruction is a function of the fluid velocity the output of those magnetic sensors which are adjacent to the permanent magnets mounted on the outer wall of the obstruction will give an indication of the fluid velocity.

In either form of our invention the output from one column of magnetic sensors is such as to be digital in character. If more than one column of magnetic sensors are utilized, a coded multitrack digital output may be produced. The magnetic field sensors in any one column may be so spaced as to compensate for quadratic nonlinearity and thus give an output that is linearly proportional to the fluid velocity.

In the accompanying drawings which form part of the instant specification and which are to be read in conjunction therewith and in which like reference numerals are used to indicate like parts in the various views:

FIGURE 2 is a diagrammatic sectional view of a modified form of our rate of fluid flow transducer.

FIGURE 3 is a sectional view taken along line 3—3 of FIGURE 2 drawn on an enlarged scale.

FIGURE 4 is a sectional view of another form of our rate of fluid flow transducer.

FIGURE 5 is a sectional view taken along lines 5—5 of FIGURE 4.

Figure 1:
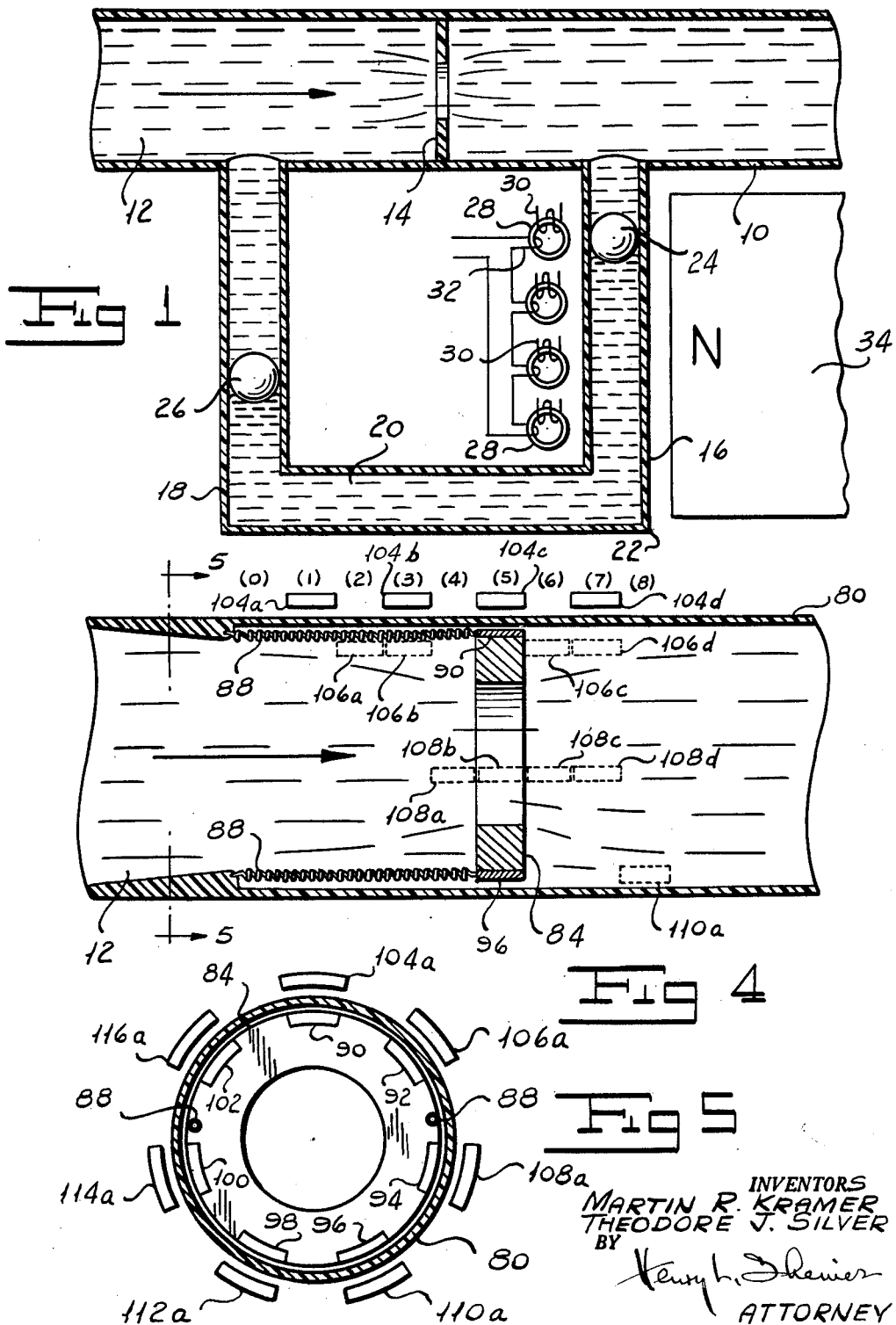
FIGURE 1 is a diagrammatic sectional view of one form of our rate of fluid flow transducer.

More particularly, referring to FIGURE 1, we provide a tube 10 carrying fluid 12. An obstruction such as orifice plate 14 is fixedly mounted within the tube 10 in order to create areas of different pressure on opposite sides thereof. It will be appreciated that a venturi tube, a flow nozzle or any other type of obstruction well known to those skilled in the art may be substituted for orifice plate 14.

A manometer tube 22 with legs 16 and 18 is connected to tube 10 on opposite sides of obstruction 14. Manometer tube 22 contains a suitable gauge fluid 20 such as mercury which supports two slugs, such as balls 24 and 26 in legs 16 and 18 respectively. Ball 24 is composed of ferromagnetic material such as iron and is of a specific density less than that of the gauge fluid 20. Ball 26, which may be omitted, is provided to equalize the pressure produced on gauge fluid 20 by ball 24 and may be of any suitable composition with a specific gravity less than that of the gauge fluid. An array of magnetic field sensing devices such as toroidal cores 28 of saturable ferromagnetic material having readout windings 30 and serially connected interrogating windings 32 is placed adjacent one side of leg 16 of manometer tube 22 opposite and in proximity to a magnet 34 which may be either permanent or electromagnetic. The toroidal cores and windings are essentially saturable core reactors. It will be appreciated that any appropriate magnetic field sensing devices such as an apertured ferrite plate, Hall crystals, or the like, may be used in place of toroids 28.

In the operation of our invention as shown in FIGURE 1, obstruction 14 creates a pressure differential in tube 10 on opposite sides of orifice plate 14 which causes a change in the levels of the gauge fluid 20 in manometer tube 22. This causes a change in the position of ferromagnetic ball 24 which is floated in the gauge fluid in leg 16. Normally a signal imposed on interrogating winding 32 on toroid 28 will create an output signal in readout winding 30. However, when ball 24 is adjacent a toroid 28, it will link magnetic lines of flux from permanent magnet 34 to the toroid thus saturating it. If a signal is now imposed on winding 32, no output signal will be produced in winding 30 due to the saturation of the toroid. It will be readily seen that the position of the ball will be indicated by that sensor which gives no response to an interrogating signal. This position will give an indication of fluid velocity.

The readout windings of the array of magnetic field sensors may be connected in series or parallel thus creating a single channel. Each sensor that the ball passes while changing from its no velocity position to its final velocity position will create a change in the output signal of the channel. The number of changes or pulses in the output signal will give an indication of the fluid velocity by signaling the incremental change from the previously indicated velocity. These pulses may be measured by a suitable digital direction sensitive counter or the like not shown since such are known to the art. It will be appreciated that a plurality of columns of magnetic sensors may be used in order to produce a coded multitrack digital output in a manner to be hereinafter described.

Referring now to FIGURES 2 and 3, a tube 10 carrying fluid 12 is fixedly mounted with an obstruction 14 to produce a pressure differential. A manometer tube 40 with legs 42 and 44 containing gauge fluid 20 is connected to tube 10 on opposite sides of obstruction 14. A cylindrical slug 48 carrying a plurality of permanent magnets 50, 52, 54, 56 positioned about its periphery is floated in gauge fluid 20 in leg 44. A similar slug 46, without magnets, may be floated in gauge fluid 20 in leg 42 in order to equalize the pressure on gauge fluid 20 created by slug 48. Magnetic field sensors 62a, 62b, 62c, 62d are arranged in a first column adjacent to leg 44. Magnetic field sensors 64a, 64b, 64c, 64d are arranged in a second column adjacent to leg 44. Magnetic field sensors 66a, 66b, 66c, 66d are arranged in a third column adjacent leg 44. Magnetic field sensor 68a is in a fourth column adjacent leg 44. It will be appreciated that more than four columns of sensors would normally be utilized to obtain greater range and resolution and we have shown four columns by way of illustration and not by way of limitation. A key 70 is provided on slug 48 to fit into slot 72 on leg 44. Keying is necessary to prevent rotation of permanent magnets 50, 52, 54, 56 relative to the four columns of magnetic sensors. These sensors may be of any appropriate construction such as shown in FIGURE 1. Leg 44 is composed of nonmagnetic material, such as plastic, so that magnetic lines of flux from the permanent magnets will permeate to the field sensors. These field sensors are preferably imbedded in leg 44 and spaced closed together so that high resolution may be obtained. It will be appreciated by those skilled in the art that a permanent magnet of suitable shape could be substituted for slug 48 such that the necessity for keying would be eliminated from the embodiment of our invention shown in FIGURES 2 and 3.

In operation, obstruction 14 creates a pressure differential which causes a change in the levels of gauge fluid 20 in legs 44 and 42. The position of slug 48 floated in gauge fluid 20 will also change. This position will be indicated by those sensors adjacent permanent magnets 50, 52, 54, 56 carried by slug 48. The magnetic sensors in each column are so spaced that a multitrack digital output in binary coded form will be produced. Column one, in which sensors 62 are positioned, represents the least significant digit in our binary coded output. Column two, in which sensors 64 are positioned, represents the next to least significant digit. Column three, in which sensors 66 are positioned, represents the next to most significant digit, and Column four, in which sensor 68 is positioned, represents the most significant digit. For example, when slug 48 is in position (5), of FIGURE 2, sensor 62c in Column one will detect lines of flux from magnet 50. There will be no output to represent Column two, since there is no sensor to detect the lines of flux from magnet 52. Sensor 66b will detect lines of flux from magnet 54 and therefore produce an output representing Column three. Since an sensor is present in Column four to detect lines of flux from magnet 56, there will be no output to represent Column four. If we let the binary digit 0 be represented by no output from any of the sensors in a column and the binary digit 1 by an output from one of the sensors in a column, it will be seen that in position 5 an output representing the binary number 0101 will be produced.

Since position is a function of velocity and since each position has a unique binary coded digital output, each binary coded output represents a different velocity. Following is a table illustrating the binary coded output which will be produced at each position of the obstruction as detected by the magnetic sensors.

| Position | Output from Columns | | | |
|---|---|---|---|---|
| | 4 | 3 | 2 | 1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |

This coded digital output may be fed directly into a computer by means of appropriate circuitry.

It will be appreciated if digital pulses are to be the desired output a single column of magnetic sensors could be used as in FIGURE 1 in which case only one magnet may be needed in slug 48.

Referring now to FIGURES 4 and 5, a tube 80 carrying moving fluid 12 is internally mounted with a movable obstruction 84 biased to position by restraining springs 88. Permanent magnets 90, 92, 94, 96, 98, 100, 102 are mounted on the outer surface of obstruction 84. Magnetic field sensors 104a, 104b, 104c, 104d are arranged in a first column adjacent tube 80. Sensors 106a, 106b, 106c, 106d are arranged in a second column adjacent tube 80. Sensors 108a, 108b, 108c, 108d are arranged in a third column adjacent tube 80. Sensor 110a is in a fourth column adjacent tube 80. Sensor 112a is in a fifth column, sensor 114a is in a sixth column, and sensor 116a is in a seventh column adjacent tube 80. The section of tube 80 which is adjacent the columns of magnetic field sensors is of a suitable nonmagnetic material, such as plastic. As hereinabove described, the sensors in each column are so arranged as to produce a binary coded multitrack digital output.

In operation the pressure differential created by obstruction 84 will act on it in such a way as to cause it to move in the direction of fluid flow. Springs 88 will act to restrain this motion. The final at rest position of the obstruction will give a measurement of the fluid velocity. This position will be detected by those sensors in the various columns which are adjacent permanent magnets 90, 92, 94, 96, 98, 100, 102 in the outer wall of obstruction 84. As hereinabove described, this position will be represented by a binary coded multitrack digital output.

It will be appreciated that if digital pulses are to be the desired output that a single column of sensors could be used as in FIGURE 1 in which case only a single magnet is required.

Thus it will be seen that we have accomplished the objects of our invention. We have provided a rate of fluid flow transducer which is simple in construction, which has no linkages extending externally from inside the flow tube, which has an output linearly proportional to fluid velocity and which provides a digital output that may be multitrack in character.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A digital rate of fluid flow transducer including in combination a duct for carrying a fluid, moveable means disposed within said duct for creating a pressure differential, means biasing said moveable means to an upstream position, means for mounting said moveable means to move downstream of said fluid against the action of said biasing means, a plurality of permanent magnets carried by said moveable means, a plurality of columns of magnetic field sensing means adapted to detect the position of said moveable means and means mounting said sensing means adjacent an outer wall of said duct, said sensing means being poistioned in accordance with a digital code for digitally indicating fluid rate of flow.

2. A digital rate of flow transducer including in combination means for carrying a movable fluid, means acting on said fluid for creating a pressure differential on opposite sides thereof, magnetic means adapted to be positioned along a path in response to said pressure differential, a plurality of magnetic field sensors, said sensors being individually responsive to said magnetic means, and means for positioning said sensors at spaced locations adjacent said path whereby said sensors produce a digital indication of the fluid rate of flow.

3. A digital rate of flow transducer including in combination a duct for carrying a movable fluid, means fixedly mounted within said duct for creating a pressure differential on opposite sides thereof, a manometer tube with a first leg and a second leg respectively connected to said duct on oppoiste sides of said fixed means, gauge fluid disposed within said manometer tube, means floated in said gauge fluid within said first leg, means comprising magnetic means carried by said floated means for producing a magnetic field, said floated means and said magnetic means adapted to be positioned along said first leg in response to said pressure differential, a plurality of magnetic field sensors, said sensors being individually operable by said magnetic means, and means for positioning said sensors adjacent said first leg and at spaced locations therealong whereby said sensors produce a digital indication of the fluid rate of flow.

4. A digital rate of flow transducer including in combination a duct for carrying a movable fluid, an obstruction for creating a pressure differential on opposite sides thereof, a manometer tube with a first leg and a second leg respectively connected to said duct on opposite sides of said obstruction, gauge fluid disposed within said manometer tube, a slug floated in said gauge fluid within said first leg, means comprising magnetic means carried by said slug for producing a magnetic field, and a plurality of columns of magnetic field sensing means positioned adjacent said first leg, groups of said sensing means from the respective columns being positioned along the length of said first leg in an array representing a binary code, said groups of sensing means being individually operable in response to said magnetic field to provide a binary coded digital indication of the fluid rate of flow.

5. A digital rate of flow transducer as in claim 4 including means for preventing rotation of said slug relative to said first leg.

6. A digital transducer including in combination a duct carrying a movable fluid, means acting on said fluid for creating a pressure differential on opposite sides thereof, a manometer tube with a first leg and a second leg respectively connected to said duct on opposite sides of said pressure differential producing means, gauge fluid disposed within said manometer tube, a first slug floated on said gauge fluid within said first leg, a second slug floated on said gauge fluid within said second leg to equalize the pressure on said gauge fluid produced by said first slug, means comprising magnetic means carried by said first slug for producing a magnetic field, a plurality of magnetic field sensing means positioned adjacent said first leg, said sensing means being individually responsive to said magnetic means, and means for positioning said sensing means at spaced locations along the length of said first leg to detect the position of said first slug to produce a digital indication of the rate of flow.

7. A digital rate of flow transducer as in claim 6 in which said field producing means comprises a magnet extending over the length of said first leg and in which said first slug is formed of ferromagnetic material.

8. A digital rate of flow transducer as in claim 6 in which said magnetic means is a magnet carried by said first slug.

9. A digital rate of flow transducer including in combination a duct for carrying a fluid, movable means disposed within said duct, means biasing said movable means to an upstream position, means for mounting said movable means to move downstream of said fluid against the action of said biasing means, means comprising magnetic means carried by said movable means for producing a magnetic field, a plurality of magnetic field sensing means, said field sensing means being individually responsive to said magnetic field, and means positioning said sensing means at spaced locations along the length of said duct to sense the position of said movable means to provide a digital indication of rate of flow.

References Cited in the file of this patent

UNITED STATES PATENTS

| 993,437 | Cole | May 30, 1911 |
| 2,424,766 | Miner | July 29, 1947 |
| 2,740,110 | Trimble | Mar. 27, 1956 |
| 2,769,337 | Rich | Nov. 6, 1956 |
| 2,931,023 | Quade | Mar. 29, 1960 |